C. H. SMITH.
Spectacles.
No. 2,352.            Patented Nov. 12, 1841.
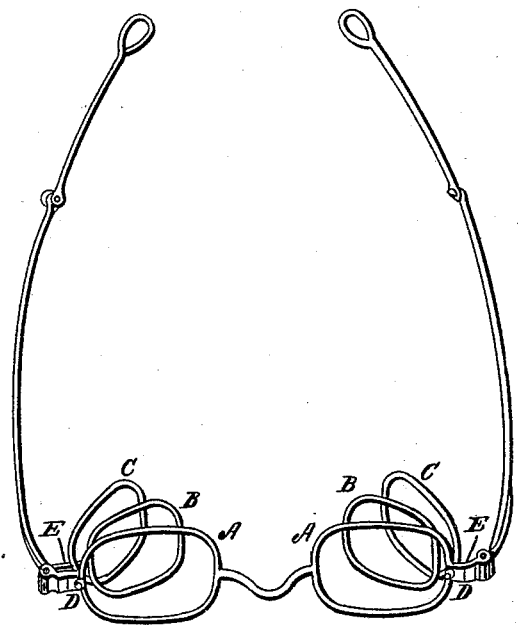

UNITED STATES PATENT OFFICE.

CHRISTOPHER H. SMITH, OF NIAGARA FALLS, NEW YORK.

CONSTRUCTION OF SPECTACLES.

Specification of Letters Patent No. 2,352, dated November 12, 1841.

*To all whom it may concern:*

Be it known that I, CHRISTOPHER H. SMITH, of the village of Niagara Falls, in the county of Niagara and State of New York, have invented a new and useful Improvement in Spectacles; and I do hereby declare that the following is a full and exact description.

The nature of my invention and improvement consists in two pairs of glasses that revolve, being united by hinge joints and connected to the main frame within the temple bows as hereinafter described. These spectacles have frames nearly resembling the common spectacles in use which I shall term "main frame" with apertures A A, having no glasses fixed in the usual way, but the rims where the glasses are usually secured, and when the glasses are all turned up together within the temple bows are unoccupied apertures A A. The "revolving spectacles" (as I term them) have two pairs of glasses B B and C C to every frame; each pair may be plain, convex or concave, with or without color to suit the person using them. Each pair of glasses is set in rims, two kinds being coupled together B C, by hinge joints E E, (and when folded together can be changed at will) which are attached to the main frame within the temple bows by the use of pivots or swivels D D, affixed in the center of said joints, thence passing through the main frame near the apertures A A, and headed upon the outside. The two pairs of glasses or rims that revolve are so uniformly made that in their revolutions or changes as to fit into the apertures A A by a gentle pressure settle into the grooving even with the main frame safely secured for use, and in such a manner that they nearly resemble the common spectacles with double glasses now in use—therefore it will be seen that when either pair of glasses are removed from the apertures A A, the other pair will occupy their places with all convenience. By this arrangement each pair of glasses may have different focal distances and be of different colors, each pair may be used separately, or both pairs at the same time, producing three different focal distances if necessary, and answering all the purposes of three separate, single pairs of glasses.

What I claim as my invention and desire to secure by Letters Patent, is—

Combining the glasses B, B, and C, C, with each other and with the main frame by means of the hinge and swivel joint or arrangement herein described which admits of the glasses being changed, and at the same time adapted to the vacant apertures A, A, all as set forth.

Niagara Falls, Oct. 26, 1841.

CHRISTOPHER H. SMITH.

Witnesses:
 P. B. PORTER, Jr.,
 G. H. WOODRUFF.